Figure 1:
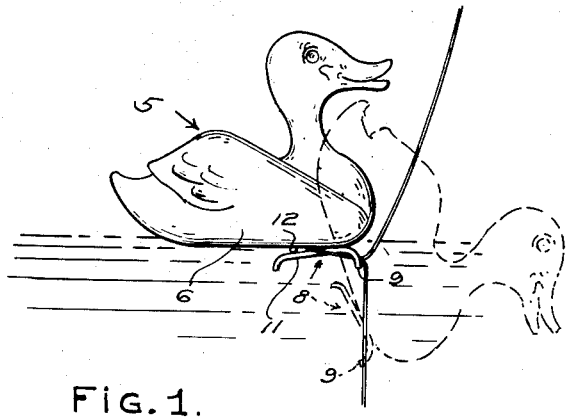

July 17, 1956  F. M. SCHULTZ  2,754,609
FISHING LINE BOBBER
Filed Aug. 8, 1952

INVENTOR.
FRED M. SCHULTZ,
BY
ATTORNEY.

2,754,609
FISHING LINE BOBBER

Fred M. Schultz, Miami, Fla., assignor of one-half to Jack Reichman, Miami, Fla.

Application August 8, 1952, Serial No. 303,351

1 Claim. (Cl. 43—17)

This invention relates to fishing floats, bobbers or the like of the type commonly employed to float upon the water to indicate a strike by a fish.

The bobber of the present invention has been formed of an ornamental nature and embodies a novel wedging line connector for the fishing line that enable the line to be attached to the bobber at any desirable point and which will firmly grip the line against slipping or accidental displacement without the necessity of forming knots or other attaching means that is difficult to later detach.

The bobber of the present invention further is of such a nature that it may be economically molded from plastic or like substances, is cheap to manufacture, is strong, durable and highly effective in use.

Other novel features of construction will be readily apparent during the course of the following description, reference being had to the accompanying drawings, wherein has been illustrated a preferred form of the device and wherein like characters of reference are employed to denote like parts throughout.

Figure 2:
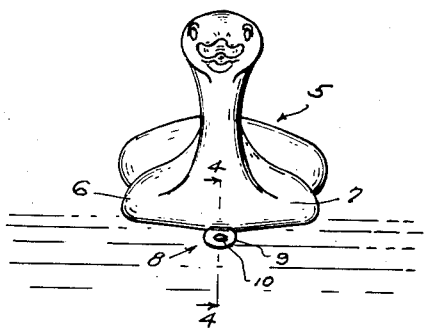
Figure 4:
Figure 4:
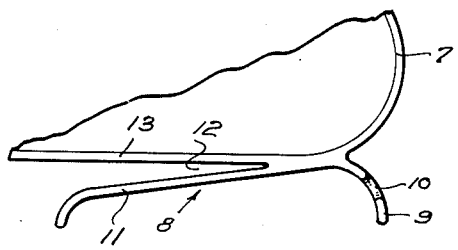
Figure 3:
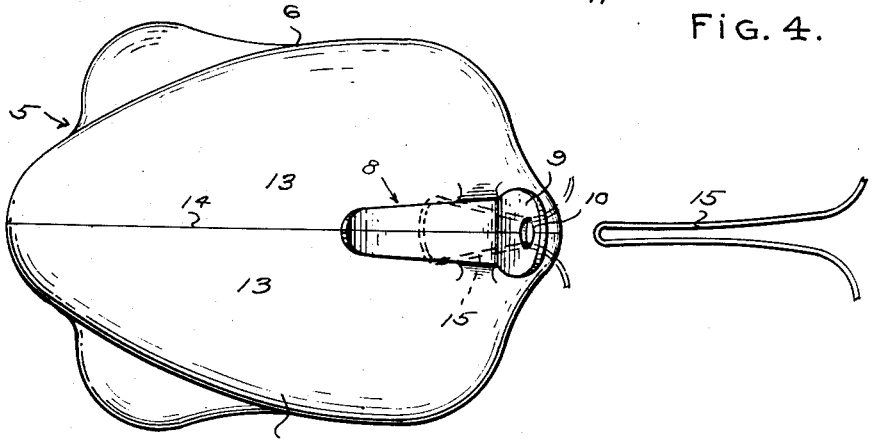

In the drawings:

Figure 1 is a side elevation of a bobber constructed in accordance with the invention and shown in use, Figure 2 is a front elevation thereof, Figure 3 is a bottom plan view thereof, slightly enlarged and, Fig. 4 is an enlarged section fragmentarily on line 4—4 of Figure 2.

Referring specifically to the drawings, the numeral 5 designates the bobber as a whole, preferably formed of plastic, molded for convenience and economy in two sections, and united permanently at assembly. The bobber as here illustrated, is in the form of a water fowl, such as a duck and balanced in manufacture to cause the duck to float evenly on the surface of the water, said duck being formed with an elongated body having a neck and head adjacent its forward end and arranged above the same, said neck and head having a normally substantially vertical central axis. The sections 6 and 7 are identical as to dimensions, being only right and left form. The sections 6 and 7 are hollow and light in weight.

Molded integral with each of the sections 6 and 7, is a half section of a line attaching device, indicated as a whole by the reference character 8. The line attaching device, as indicated more clearly in Figures 3 and 4, comprises a preferably downwardly curved nose portion 9, apertured at 10, for the passage of the fishing line, as will be presently explained. The device is then extended rearwardly in the form of an elongated tongue 11, the rear terminal end of which is preferably downwardly curved, as indicated. The tongue 11, from its point of attachment to the body of the bobber, is inclined downwardly, see particularly Figure 4, providing a line wedge recess 12 with the bottom wall 13 of the bobber, said recess having a forward reduced closed end arranged adjacent to said eye and forwardly of the substantially vertical axis of the neck and head. As before noted, it is contemplated that the entire bobber shall be molded in halves and suitably united along its longitudinal vertical center line, indicated at 14 in Figure 3, forming in effect a solid watertight and light weight float having the line attaching device projecting from its bottom wall at the forward end. The line attaching device half sections are identically mated and give the appearance of an integral structure when joined together.

In the use of the device, the operator first forms a loop 15 in the fishing line, see Figure 3, after which the loops is inserted through the aperture of the nose 9 sufficiently far to permit the loop to be slipped over the rear end of the tongue 11, after which the line is drawn forwardly, causing the loop portion to be snubbed in the wedge opening 12 of the bobber, in which position it will be positively held against slipping or disengagement. It will be apparent to anyone familiar with fishing, that the bobber is secured at a point on the line to permit the hook 16 to be suspended above the bottom of a waterway, the opposite end of the line leading to the fishing rod, not shown. When a fish strikes a bait carried upon the hook 16, the strike causes the bobber to tilt forwardly and in effect, to dive into the water, head first, indicating such strike to the fisherman. The curved nose 9 aids in causing the bobber to dive forwardly, although the pull upon the suspended line is at the front of the bobber. The bobber will be securely held against displacement accidently from the line, since the greater the pull upon the line, the greater the wedging action of the line loop will be in the wedge opening 12. To remove the bobber, the operator merely creates sufficient slack in the loop by forcing additional line through the aperture 10, after which the loops can be easily slipped back over the tongue 11 and wholly disengaged from the bobber.

It will be apparent from the foregoing, that a very novel and effective fishing bobber has been provided. The bobber can be manufactured at an exceptionally low cost and provides not only an efficient indicator for the fisherman, but is a source of amusement as the fish strikes and causes the duck to dive head first into the water from a floating position, simulating very accurately a normal action of a live duck. The body of the bobber may obviously be formed in varying colors that readily are visible on the water.

It is to be understood, that while a preferred example of the device has been shown and described, changes are contemplated as readily fall within the spirit of the invention or the scope of the subjoined claim.

Having described my invention, what I claim as new and desire to secure by Letters Patent is:

A fishing line bobber in the form of a floating water fowl including an elongated body portion and a neck and head adjacent to the forward end of the elongated body portion and arranged above the same, said body portion including a bottom, said bobber being formed of two substantially identical longitudinal mating sections which are secured together at their longitudinal edges, said neck and head having a normally vertical central axis, a line attaching device secured to the body portion and having an eye formed therein adjacent to said bottom and the forward end of the body portion and arranged forwardly of said vertical central axis, said line attaching device including an inclined tongue arranged beneath said bottom and rearwardly of and adjacent to said eye, said inclined tongue diverging from said bottom in a rearwardly direction, said inclined tongue forming with said bottom a wedge-shaped recess having a forward reduced closed end arranged adjacent to said eye and forwardly of said substantially vertical central axis, and a flexible line for carrying a hook, said line having its intermediate portion folded to provide a loop, said loop being passed through said eye and then passed over the inclined tongue rearwardly of said eye, the transverse dimension of the wedge-shaped recess close to its closed end being less than the normal diameter of said line, the arrangement being such that a pull upon the hook-carrying end of the line causes the loop to have clamping engagement with the forward end of said tongue as the loop is drawn toward said closed end of the wedge-shaped recess, said pull also serving to swing the bobber about a transverse axis so that said head may become submerged in water.

References Cited in the file of this patent

UNITED STATES PATENTS

| | | |
|---|---|---|
| 1,370,145 | Moore | Mar. 1, 1921 |
| 1,444,345 | Godward | Feb. 6, 1923 |
| 2,517,962 | Bastie | Aug. 8, 1950 |
| 2,622,360 | Bertram | Dec. 23, 1952 |

FOREIGN PATENTS

| | | |
|---|---|---|
| 873,084 | France | June 29, 1942 |